US006842323B1

(12) United States Patent
Doone et al.

(10) Patent No.: US 6,842,323 B1
(45) Date of Patent: Jan. 11, 2005

(54) ELECTRICAL SURGE ARRESTERS

(75) Inventors: Rodney Meredith Doone, Burgess Hill (GB); Patrick George Short, Burgess Hill (GB)

(73) Assignee: Bowthorpe Industries, Ltd. (GB)

( * ) Notice: Subject to any disclaimer, the term of this patent is extended or adjusted under 35 U.S.C. 154(b) by 0 days.

(21) Appl. No.: 09/868,665

(22) PCT Filed: Dec. 21, 1999

(86) PCT No.: PCT/GB99/04334

§ 371 (c)(1),
(2), (4) Date: Nov. 5, 2001

(87) PCT Pub. No.: WO00/38200

PCT Pub. Date: Jun. 29, 2000

(30) Foreign Application Priority Data

Dec. 21, 1998 (GB) .......... 9828184

(51) Int. Cl.[7] .......... H02H 9/06
(52) U.S. Cl. .......... 361/117
(58) Field of Search .......... 361/117–127; 338/20–21

(56) References Cited

U.S. PATENT DOCUMENTS

| | | | | |
|---|---|---|---|---|
| 4,369,480 A | * | 1/1983 | Crucius et al. | 361/128 |
| 5,218,508 A | * | 6/1993 | Doone | 361/127 |
| 5,317,473 A | * | 5/1994 | Lundquist et al. | 361/117 |
| 5,444,429 A | * | 8/1995 | Sakich et al. | 338/21 |

* cited by examiner

*Primary Examiner*—Stephen W. Jackson
*Assistant Examiner*—Boris Benenson
(74) *Attorney, Agent, or Firm*—Connolly, Bove, Lodge & Hutz LLP

(57) ABSTRACT

A high voltage (station class) surge arrester comprises a plurality of serially connected stage. Each stage comprises a plurality of low voltage (distribution class) polymer housed solid state surge arresters which are electrically matched. The individual surge arresters of each stage are connected together and to the respective surge arresters of the (or each) adjacent stage by means of cast metal mounting brackets (spiders) having plural equiangularly-spaced limbs to the ends of which the surge arresters are attached. Corona suppression rings are mounted at the top end of the arrester and separate corona suppression components are mounted at the ends of the limbs of the intermediate stages.

10 Claims, 1 Drawing Sheet

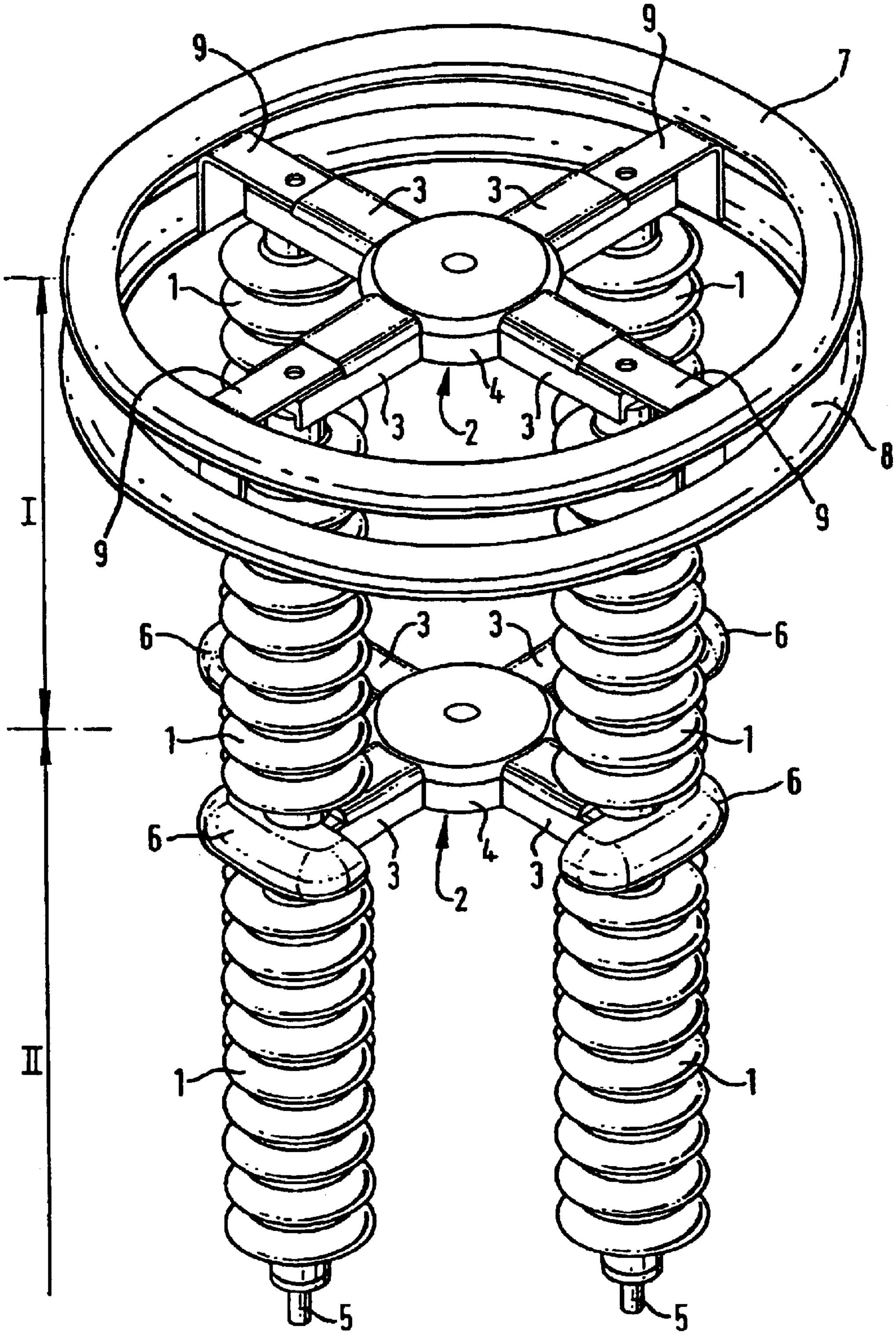
9
9
7
3
3
1
1
4
2
3
3
8
9
9
I
6
6
3
3
1
1
6
6
3
4
3
2
II
1
1
5
5

ELECTRICAL SURGE ARRESTERS

FIELD OF THE INVENTION

This invention concerns improvements relating to electric surge arresters, also known as surge diverters, as used in electrical power generation and distribution systems for the safe handling of atmospherically induced surges, arising from lightning strikes for example, and over-voltages caused by switching operations.

BACKGROUND OF THE INVENTION

We pioneered the introduction of polymer housed solid-state distribution class surge arresters, as disclosed in GB-A-2188199 for example, and in GB-A-2230661 we proposed the utilization of a series parallel arrangement of a plurality of such distribution class surge arresters as a station class surge arrester. Distribution class surge arresters generally have voltage ratings of the order of 24 to 36 kV and by coupling together a plurality of electrically matched such distribution class surge arresters in a series parallel arrangement as described in GB-A-2230661 much higher voltage ratings of the order of 120 to 456 kV can be accommodated.

Our series parallel station class surge arrester is designed to replace the conventional porcelain housed station class rester and has been widely acclaimed. The present invention concerns improvements in the construction of the series parallel arrester.

SUMMARY OF THE INVENTION

Whereas in the series parallel surge arrester described in GB-A-2230661 the individual distribution class surge arresters of adjacent serial stages were offset from each other, the present invention proposes to provide the arrester units in line throughout the series parallel arrangement. Furthermore, whereas in the surge arrester of GB-A-2230661 metal mounting plates formed integrally with corona suppression rings at their peripheries were utilized for interconnecting adjoining stages of the series parallel arrangement the present invention proposes a more simple and cost effective arrangement employing multiple-limbed brakets (spiders) in place of the mounting plates, the distal ends of the limbs being provided with corona discharge inhibiting surfaces.

The above and further features of the present invention are set forth with particularity in the appended claims and will be well understood from consideration of the following description given with reference to the accompanying drawing.

BRIEF DESCRIPTION OF THE DRAWING

The single FIGURE of the accompanying drawing illustrates the upper (top) end of an exemplary series parallel surge arrester according to the present invention in perspective view.

DETAILED DESCRIPTION OF THE EMBODIMENT

The series parallel surge arrester shown in the accompanying drawing comprises a plurality of series-connected stages I, II, etc (only the top two of which are shown) each made up of four electrically matched surge arresters 1 which can, for example, be of the kind described in GB-A-2188199 but could be otherwise formed so long as they exhibit sufficient structural integrity. The individual surge arresters 1 in each stage I, II, etc are coupled together and to the adjoining arresters of the next adjacent stage by means of cast metal brackets (spiders) 2 having a plurality of limbs 3 extending from a central body portion 4 with even angular spacing of 90°. As can be seen, the individual surge arresters 1 of the different stages are aligned with each other.

The individual sure arresters 1 have externally screw-threaded end fixing studs S which enable the surge arresters to be affixed to the ends of the limbs 3 of the brackets 2, for example by provision of a double and oppositely screw-threaded locking nut at the end of each limb 3 which can be turned with a spanner so as to pull the opposite ends of the respective two surge arresters together and into mounting engagement with the end of the respective limb.

Mounted at the ends of the limbs 3, after attachment of the surge arresters 1, are cast meal corona suppression bodies 6 which can for example form a push fit onto the ends of the limbs 3 with close conformance around the ends of the two surge arresters 1 that are attached to the respective limb. The surfaces of the bodies 6 are smoothly curved as shown to avoid giving rise to excessive field voltages such as might give rise to corona discharge effects.

At the top end of the series parallel arrangement, a corona suppression arrangement comprising parallel spaced-apart rings 7 and 8 which are coupled to the limbs 3 of the uppermost mounting bracket 2 by means of mounting brackets 9.

The illustrated series parallel surge arrester is believed to satisfy electrical requirements and the mounting brackets 2 and their accessories, namely the corona suppression bodies 6 and the rester fixing nuts (not shown), can be manufactured at lower cost than the electrostatic mounting plates of the series parallel surge arrester described in GB-A-2230661). Furthermore, by virtue of the in line connection of the surge arresters of adjacent stages, the overall stiffness of the series parallel sure arrester can be increased as compared to that of GB-A-2230661. Otherwise the illustrated surge arrester obtains all of the advantages that are described in GB-A-2230661. Modifications and variations are of course possible without departure from the spirit and scope of the intention as set forth in the appended claims; for example, the brackets 2 could have more or less limbs than the four limbs shown.

What is claimed is:

1. A high voltage surge arrester comprising a plurality of serially connected arrester stages each of which comprises a plurality of electrically matched low voltage surge arresters connected in parallel, the low voltage surge arresters of each stage being connected together and to the surge arresters of the or each next adjacent stage by means of a multiple limbed mounting bracket having corona suppression means at the end of each limb.

2. A high voltage surge arrester as claimed in claim 1 wherein at the top of the surge arrester the corona suppression means comprises at least one corona suppression ring.

3. A high voltage surge arrester as claimed in claim 1 wherein the corona suppression means at the ends of the limbs of the mounting bracket supporting the ends of adjacent serial stages of the arrester comprise individual bodies associated each with a respective one of the limbs.

4. A high voltage surge arrester as claimed in claim 1 which is adapted for station class operation and wherein the low voltage surge arresters are distribution class surge arresters.

5. A high voltage surge arrester as claimed in claim 1 wherein the low voltage surge arresters are polymer housed solid state surge arresters.

6. A high voltage surge arrester comprising:

a plurality of serially connected arrester stages, each of said stages including a plurality of electrically matched low voltage surge arresters connected in parallel;

a multiple limbed mounting bracket connecting each of said stages together so that arresters of each stage are aligned along a common line with arresters of an adjacent stage; and corona suppression means supported on said multiple limbed mounting bracket.

7. A high voltage surge arrester comprising:

first plurality of electrically matched low voltage arresters spaced apart and parallel to each other;

a second plurality of electrically matched low voltage arresters in line with said first plurality of arresters; and a first bracket having radial limbs which connect first ends of said low voltage surge arresters of said first plurality of arresters to first ends of said surge arresters of said second plurality of arresters, forming a series circuit between parallel connected first and second plurality of surge arresters.

8. A high voltage surge arrester according to claim 7 further comprising:

a first corona suppression means supported to said radial limbs.

9. The high voltage surge arrester according to claim 8 comprising:

a second bracket connected to a remaining end of said first plurality of electrically matched low voltage arresters; and said second bracket supporting a second corona suppression means.

10. The high voltage surge arrester according to claim 9 wherein said second corona suppression means comprise a pair of parallel spaced apart ring.

* * * * *